Jan. 28, 1947.  T. R. BRIEN  2,414,851
LAWN MOWER SHARPENER
Filed May 16, 1945
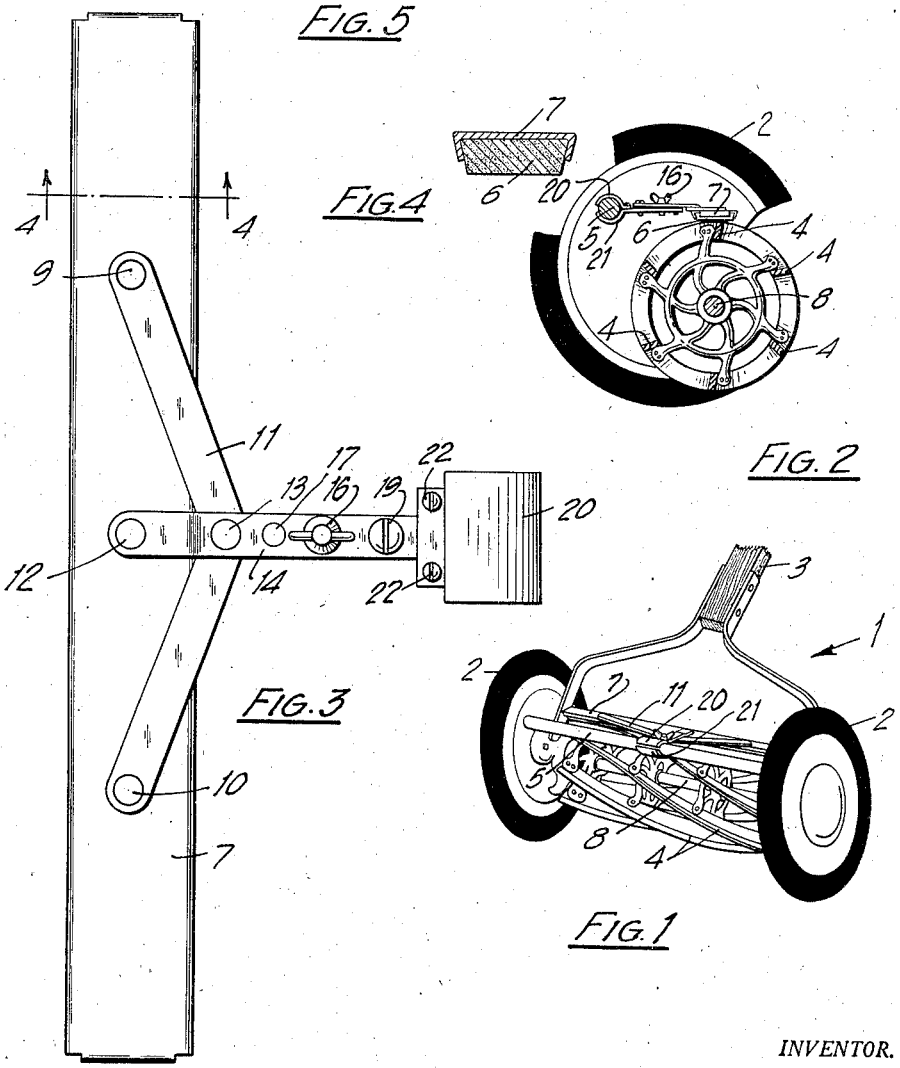
INVENTOR.
T. R. Brien
BY
ATTORNEY Patented Jan. 28, 1947

2,414,851

UNITED STATES PATENT OFFICE 2,414,851

LAWN MOWER SHARPENER

Theodore R. Brien, Cherry Valley, N. Y.

Application May 16, 1945, Serial No. 594,008

1 Claim. (Cl. 51—250)

My invention relates to lawn mower sharpeners and particularly to a device adapted for convenient attachment to a lawn mower and which may be used to sharpen the rotating blades thereof by merely pushing the mower along the ground in the same manner in which it is used to mow a lawn.

The principal object of my invention is to provide a simple device of this character which may be readily attached to a lawn mower and which is readily adjustable to provide precisely the proper contact between the blades and the sharpening medium.

I accomplish this by the means described below and illustrated in the accompanying drawing in which—

Fig. 1 is a fragmentary perspective view of a lawn mower showing my sharpener attached thereto;

Fig. 2 is a fragmentary cross section, to a somewhat larger scale than Fig. 1, through the movable cutting blades of a lawn mower, with certain details, such as the fixed cutting bar omitted, and showing my device attached thereto;

Fig. 3 is a top plan view of the sharpener;

Fig. 4 is a section of Fig. 3 in the plane 4—4; and

Fig. 5 is a partially exploded end view of the device shown in Fig. 3 with certain portions broken away and other portions in section.

Referring to the drawing—

1 represents the lawn mower generally having the ground wheels 2, handle 3 and the helicoidal revolving blades 4 which are understood to be driven by the ground wheels, or one of them, in the usual manner. 5 is the usual guard bar extending transversely of the machine.

My sharpener, which is adapted for attachment to the guard bar, comprises a carborundum or other abrasive element 6 secured in a metal frame 7. The length of the element 6 is substantially the same as the length of the helicoidal cutting blades as measured in a direction parallel to the shaft 8 on which they are mounted. Spot welded or otherwise secured to the top of the frame 7, as at 9 and 10, is the V-shaped member 11. Spot welded or otherwise secured to the frame 7, as at 12, and also spot welded or otherwise secured to the V-shaped member 11, as at 13, is the member 14 which forms with the member 11 a sort of Y-like assembly in which the member 14 is the stem. The member 14 is provided with an opening 15 for the free passage of the winged stud 16 which engages the threaded passage 26 in member 21, and intermediate the opening 15 and the edge of the member 11, is provided with a depending projection 17. On the opposite side of the winged stud from the projection 17 the member 14 is provided with a threaded opening 18 adapted to receive the adjusting screw 19.

In order to secure the device to the guard bar I provide the clamping members 20 and 21 which are adapted to embrace the bar 5 and be securely clamped thereon by means of screws 22 which pass freely through openings 23 in the member 20 and engage threaded passages 24 in the member 21. The member 21 is provided with a depression 27 adapted to receive the end of the adjusting screw 19.

In operation, the assembled device as shown in Fig. 3 is secured to the cross bar 5 by means of the clamping members 20 and 21 in approximately the correct position so that the face of the abrasive element 6 contacts the blades 4. The device is then precisely adjusted by means of the winged stud 16 and the screw 19 so that the face of the element 6 bears against the edges of the blades 4 with the required pressure. It is to be understood that the member 14 is primarily secured to the clamping element 21 by means of the winged stud 16, and when this stud is tightened the parts are in rigidly fixed relation. By slightly loosening the stud 16 and turning the adjusting screw 19 further into the threaded passage in member 14 the abrasive element may be tilted slightly downwardly towards the cutting edges, and by reversing the procedure, if the pressure upon the blades is too great, the abrasive element may be raised so as to contact the blades more lightly. Thus, precisely the correct pressure between the element 6 and the blades may be attained. When adjusted, merely pushing the lawn mower over the ground will cause the helicoidal blades to revolve in contact with the face of the element 6 and, after the blades have been properly honed the abrasive element may be raised out of contact therewith but need not be removed from the machine.

What I claim is:

A sharpener for a lawn mower of the type having rotating cutting bars and a guard bar; said sharpener comprising, in combination, a frame, an abrasive element secured in said frame a single clamp comprising a pair of clamping members adapted to be clamped together about said guard bar in the center thereof; one of said members having a portion adapted to project substantially from said guard bar towards said cutting bars when clamped on said guard bar; a Y-shaped member having the branches thereof secured to said frame and the stem thereof in registration with said projecting clamp member, means for detachably securing said stem and said projecting clamp member together, and means, including said last mentioned means, for adjusting and holding said abrasive element in adjusted relation with respect to the cutting bars of said mower.

THEODORE R. BRIEN.